(12) United States Patent
Narahara et al.

(10) Patent No.: US 8,613,023 B2
(45) Date of Patent: Dec. 17, 2013

(54) INFORMATION PROCESSOR, INFORMATION PROCESSING METHOD AND COMPUTER PROGRAM

(75) Inventors: Tatsuya Narahara, Kanagawa (JP); Nobuyuki Fujiwara, Kanagawa (JP)

(73) Assignee: Sony Corporation, Tokyo (JP)

( * ) Notice: Subject to any disclaimer, the term of this patent is extended or adjusted under 35 U.S.C. 154(b) by 1622 days.

(21) Appl. No.: 10/995,340

(22) Filed: Nov. 24, 2004

(65) Prior Publication Data
US 2005/0144499 A1  Jun. 30, 2005

(30) Foreign Application Priority Data

Dec. 2, 2003 (JP) ................................. 2003-403728

(51) Int. Cl.
  *H04H 60/33* (2008.01)
  *H04H 60/32* (2008.01)
  *G06F 3/00* (2006.01)
  *G06F 13/00* (2006.01)
  *H04N 5/445* (2011.01)

(52) U.S. Cl.
  USPC ........ 725/46; 725/9; 725/14; 725/48; 725/52; 725/53

(58) Field of Classification Search
  USPC ............. 725/37, 40, 44–47, 116, 131, 39, 97; 707/3–7, 101
  See application file for complete search history.

(56) References Cited

U.S. PATENT DOCUMENTS 5,734,720 A * 3/1998 Salganicoff .................. 380/211
5,758,257 A   5/1998 Herz et al.
5,790,935 A * 8/1998 Payton ............................. 725/91
6,507,836 B1 * 1/2003 Nose et al. ........................ 707/3

(Continued)

FOREIGN PATENT DOCUMENTS

EP        1 041 821 A2    10/2000
JP        2003-250146      9/2003

(Continued)

OTHER PUBLICATIONS

Shunsuke Doi, et al., "User Selection Method used in Communication service for Contents viewer", The Institute of Electronics, Information and Communication Engineers, Mar. 2002, pp. 1-6.

(Continued)

*Primary Examiner* — Pankaj Kumar
*Assistant Examiner* — Randy Flynn
(74) *Attorney, Agent, or Firm* — Oblon, Spivak, McClelland, Maier & Neustadt, L.L.P.

(57) ABSTRACT

Disclosed is a content-view supporting system to recommend to a user a clear result of searched contents, based on a group of similar users' favorite programs, through a user-basis collaborative filtering process. The system selects similar users whose program view history is similar to that of a recommended user, maps the program view history in a collaborative filtering matrix registers, in the collaborative filtering matrix, a virtual user whose program view history includes a group of hit programs obtained based on a search condition served for realizing a predetermined search topic. The system also counts the numbers of reservations or views achieved by each user according to program content based on the program view history, in the collaborative filtering matrix, which counted numbers are set as matching numbers, and outputs a search result representing a recommendation list of the contents arrayed in the descending order of matching number.

15 Claims, 16 Drawing Sheets

(56) References Cited

U.S. PATENT DOCUMENTS

| | | | |
|---|---|---|---|
| 6,701,362 B1 * | 3/2004 | Subramonian et al. | 709/224 |
| 6,704,931 B1 * | 3/2004 | Schaffer et al. | 725/46 |
| 6,925,610 B2 * | 8/2005 | Thurston et al. | 725/46 |
| 7,035,863 B2 * | 4/2006 | Kurapati et al. | 707/101 |
| 7,082,428 B1 * | 7/2006 | Denny et al. | 707/5 |
| 7,117,518 B1 * | 10/2006 | Takahashi et al. | 725/46 |
| 7,188,355 B1 * | 3/2007 | Prokopenko et al. | 725/46 |
| 7,571,452 B2 * | 8/2009 | Gutta | 725/46 |
| 7,757,250 B1 * | 7/2010 | Horvitz et al. | 725/35 |
| 2001/0027563 A1 * | 10/2001 | White et al. | 725/46 |
| 2001/0039656 A1 * | 11/2001 | Nakamura et al. | 725/9 |
| 2002/0108113 A1 * | 8/2002 | Schaffer et al. | 725/46 |
| 2003/0106057 A1 * | 6/2003 | Perdon | 725/45 |
| 2003/0131355 A1 * | 7/2003 | Berenson et al. | 725/46 |
| 2003/0226146 A1 * | 12/2003 | Thurston et al. | 725/46 |
| 2004/0083490 A1 * | 4/2004 | Hane | 725/46 |

FOREIGN PATENT DOCUMENTS

| | | | |
|---|---|---|---|
| WO | WO 01/15449 A1 | 3/2001 | |
| WO | WO 01/46843 A2 | 6/2001 | |
| WO | WO 0225939 A2 * | 3/2002 | |

OTHER PUBLICATIONS

Yasuhiro Murasaki, et al., "TV Program Selection System based on a User Model Agent", The Institute of Electronics, Information and Communication Engineers Technical Report of IEICE, vol. 101, 420, Nov. 9, 2001, 2 front pages, pp. 25-31.

Tomofumi Asakawa, et al., "Recommendation using Partial Similarity of User's Taste", The Institute of Electronics, Information and Communication Engineers, Mar. 2001, pp. 1-9.

* cited by examiner

FIG. 6

RECOMMENDED PROGRAM FOR YOU

(PROGRAM A) PROFESSIONAL BASEBALL GAME (HANSHIN VS. KYOJIN)
(PROGRAM B) PROFESSIONAL BASEBALL NEWS
THOSE WHO HAVE RESERVED ABOVE RESERVE ALSO FOLLOWING PROGRAMS

| RECOMMENDED PROGRAM | CONTENT | MATCHING NUMBER |
|---|---|---|
| PROGRAM C | PROFESSIONAL BASEBALL GAME XX VS. YY | 3 |
| PROGRAM E | "GO" LECTURE | 2 |
| PROGRAM G | PROFESSIONAL "SHOGI" PLAYER'S CHAMPIONSHIP SERIES | 2 |
| PROGRAM D | PROFESSIONAL BASEBALL NEWS | 1 |
| PROGRAM F | "GO" CHAMPION'S DEFENSIVE GAME | 1 |
| PROGRAM H | LAST MATCH OF "SUMO" | 1 |

F I G. 7

| | PROFESSIONAL BASEBALL ||| GAME OF GO/SHOGI ||| SUMO |||
|---|---|---|---|---|---|---|---|---|---|
| | PROGRAM A | PROGRAM B | PROGRAM C | PROGRAM D | PROGRAM E | PROGRAM F | PROGRAM G | PROGRAM H | PROGRAM I | PROGRAM J |
| SEARCHED RESULT OF PROFESSIONAL BASEBALL PROGRAMS | ◎ | ◯ | ◎ | ◎ | | | | | | |
| USER 1 | ◯ | ◯ | | | | | | | | |
| USER 2 | | ◯ | | | | ◯ | | ◯ | | |
| USER 3 | ◎ | ◎ | ◎ | | ◎ | | | ◎ | ◎ | ◎ |
| USER 4 | | ◯ | | | ◯ | | ◯ | | | ◯ |
| USER 5 | ◎ | ◎ | ◎ | | ◎ | ◎ | ◎ | | | |
| USER 6 | ◎ | ◎ | ◎ | ◎ | ◎ | ◎ | ◎ | | | |
| MATCHING NUMBER | | | 4 | 2 | 2 | 1 | 2 | 1 | 1 | 1 |

VIRTUAL USER → SEARCHED RESULT OF PROFESSIONAL BASEBALL PROGRAMS
RECOMMENDED USER → USER 1
SIMILAR USER → USER 3, USER 5, USER 6

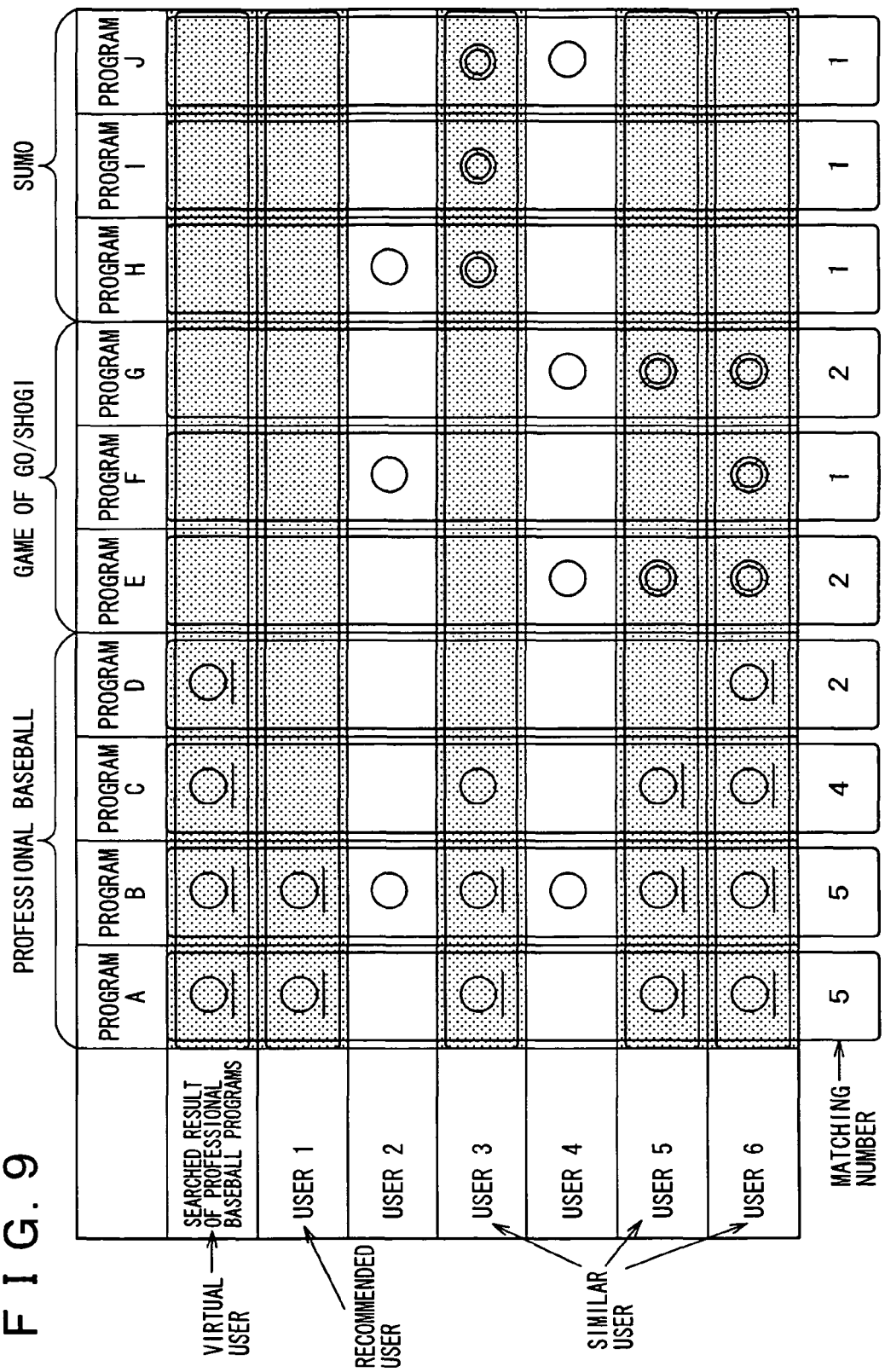

FIG. 10

RECOMMENDED PROGRAM FOR YOU, PROFESSIONAL BASEBALL FAN!

RANKING OF PROGRAMS AMONG PROFESSIONAL BASEBALL FANS

| RECOMMENDED PROGRAM | CONTENT | MATCHING NUMBER |
|---|---|---|
| PROGRAM A | PROFESSIONAL BASEBALL GAME (HANSHIN VS. KYOJIN) | 5 |
| PROGRAM B | PROFESSIONAL BASEBALL NEWS | 5 |
| PROGRAM C | PROFESSIONAL BASEBALL GAME XX VS. YY | 4 |
| PROGRAM D | PROFESSIONAL BASEBALL NEWS | 2 |

BELOW ARE ALSO RESERVED BY PROFESSIONAL BASEBALL FANS

| RECOMMENDED PROGRAM | CONTENT | |
|---|---|---|
| PROGRAM E | "GO" LECTURE | 2 |
| PROGRAM G | PROFESSIONAL "SHOGI" PLAYER'S CHAMPIONSHIP SERIES | 2 |
| PROGRAM F | "GO" CHAMPION'S DEFENSIVE GAME | 1 |
| PROGRAM H | LAST MATCH OF "SUMO" | 1 |

FIG. 11

RECOMMENDED PROGRAM FOR YOU, PROFESSIONAL BASEBALL FAN!

RANKING OF PROGRAMS AMONG PROFESSIONAL BASEBALL FANS

| RECOMMENDED PROGRAM | CONTENT |
|---|---|
| PROGRAM A | PROFESSIONAL BASEBALL GAME (HANSHIN VS. KYOJIN) |
| PROGRAM B | PROFESSIONAL BASEBALL NEWS |
| PROGRAM C | PROFESSIONAL BASEBALL GAME XX VS. YY |
| PROGRAM D | PROFESSIONAL BASEBALL NEWS |

BELOW ARE ALSO RESERVED BY PROFESSIONAL BASEBALL FANS

| RECOMMENDED PROGRAM | CONTENT |
|---|---|
| PROGRAM E | "GO" LECTURE |
| PROGRAM G | PROFESSIONAL "SHOGI" PLAYER'S CHAMPIONSHIP SERIES |
| PROGRAM F | "GO" CHAMPION'S DEFENSIVE GAME |
| PROGRAM H | LAST MATCH OF "SUMO" |

[REGISTER IN GROUP OF PROFESSIONAL BASEBALL FANS]

FIG. 13

RECOMMENDED PROGRAM FOR YOU, PROFESSIONAL BASEBALL FAN!

BELOW ARE ALSO RESERVED BY PROFESSIONAL BASEBALL FANS

| RECOMMENDED PROGRAM | CONTENT | MATCHING NUMBER |
|---|---|---|
| PROGRAM C | PROFESSIONAL BASEBALL GAME XX VS. YY | 4 |
| PROGRAM D | PROFESSIONAL BASEBALL NEWS | 2 |
| PROGRAM E | "GO" LECTURE | 2 |
| PROGRAM G | PROFESSIONAL "SHOGI" PLAYER'S CHAMPIONSHIP SERIES | 2 |
| PROGRAM F | "GO" CHAMPION'S DEFENSIVE GAME | 1 |
| PROGRAM H | LAST MATCH OF "SUMO" | 1 |

INFORMATION PROCESSOR, INFORMATION PROCESSING METHOD AND COMPUTER PROGRAM

BACKGROUND OF THE INVENTION

1. Field of the Invention

The present invention relates to an information processor, information processing method and computer program for supporting content processing including recording or reproducing of contents, and more particularly to an information processor, information processing method and computer program for supporting content processing including viewing, recording, recording reservation and reproducing of TV program contents.

More particularly, the present invention relates to an information processor, information processing method and computer program for supporting content processing based on a view history of users, and particularly to an information processor, information processing method and computer program for supporting content processing for a particular recommended user based on a view history of each of a plurality of users.

2. Description of the Related Art

In these modern days, the role of the broadcast is so incredible in the information-oriented society. In particular, one of the most influential features of the broadcast is the TV broadcast that directly provides viewers with audio information together with video information. The broadcast technology includes a wide variety of techniques, such as signal processing, transmission/reception of the signals, processing of voice and video information, etc. The transmission modality for providing users with program contents includes a variety of systems, such as a broadcast system using an electric wave (e.g. a ground wave, satellite wave, etc.), a cable TV system, and an Internet program system using the computer communications, etc.

TVs have widely spread and are commonly installed in most houses. Many and unspecified persons view broadcast contents distributed from each broadcasting station. In another modality for viewing the broadcast contents, the viewers once record the received contents, and then reproduce the recorded contents any time they want.

As the result of digital technology development, it is possible to store a large volume of AV data including video and voice data. For example, available and inexpensive HDD (hard disk drive) has a capacity of several tens of GB or more. In such circumstances, available personal computers (PC) recently have a recorder at the HDD base and a system for recording/viewing TV programs.

An HDD can perform random access for recorded data. When reproducing the contents recorded in the HDD, there is no need to reproduce the contents sequentially from the beginning of the recorded program, unlike the conventional case of the video tape recorder. That is, the system can immediately reproduce a desired program (or a particular scene or part in a program) recorded in the HDD. A "sever-type broadcasting" system is one "viewing" modality for reproducing the broadcast content that has once been received and stored in a receiver (e.g. a TV or video recording/reproducing device) having a large volume of storage (e.g. HDD).

According to the "server-type broadcasting" system, users can not only receive the ordinary TV broadcast in real time, but also view pre-distributed video or audio information at a specified time. In addition, users can search for a particular scene in a program or view a digest of the program, using simultaneously distributed information.

However, as the result of the large volume of the HDD, a large number of programs are stored in a system that can record programs of several ten hours. In this case, the users may wonder which program to view first or which program to select. It is therefore necessary to effectively select, record or reserve those user-desired programs, and further to support the user to view the stored program content, otherwise the contents will be wasted. The recorder can store a large volume of recorded contents. Thus, it is hard to view all of the contents, so the users need to choose and select some desired contents. That is, it is important to perform a recording reservation operation effectively. This operation is considered to be beneficial for the users to view TV programs.

According to a known EPG (Electrical Program Guide) system, an electrical program guide is embodied in an image signal, and the signal is transmitted to a receiver and displayed on a display device of the receiver. In this case, the program guide is used for selecting a TV broadcasting program. A CE device (e.g. a HDD recorder) acquires the transmitted EPG during a recording operation of the broadcast program. Then, the acquired EPG is provided to a user, when the user reproduces or views the recorded program, resulting in some support for the views of the user.

A suggested program list display device can display a program list that is easy to understand, based on the EPG data, for example (see patent document 1). Such a program list display device can effectively display a list of some programs that the user specially desires to view, even if a number of programs correspond to a preference of the user.

According to a general method for supporting views of broadcast contents, users are provided with some recommended contents that should be viewed, recorded or reserved for recording. Such recommended contents are provided based on a result of statistical processing, using a view history of a number of users, for example.

Another suggested system provides a means for selecting programs based on conventional channel numbers or types of programs in the multi-channel broadcasting (see patent document 2). In addition to that, such a system provides the viewers with a new standard for selecting programs based on the audience rating. Further, the system enables the viewers to select a program channel (s) that a number of people view, upon a simple operation in a short period of time.

Still another system recommends the user's favorite program as estimated. This system first records a recording reservation history, recording history and reproducing/view history (hereinafter referred to as a user's program view history) representing a past action done on a video recorder. Then, the system obtains user preference regarding programs, based on the recorded information, thereby recommending the estimated favorite program.

Some system recommends an individual user an estimated program and searches for the individual user's preference, based on that user's program view history. Another system, on the other hand, statistically searches for a group of similar users whose view history is similar to that of a particular user, based on a user's program view history of a plurality of users, thereafter recommending a group of programs preferred by the group of similar users to the particular user. In such a system using the data of the plurality of users, a collaborative filtering process for user-based information is widely practiced (see non-patent document 1).

The collaborative filtering system in this case records a user preference as his/her past activity, and estimates the user's preference based on preference information of other users whose activity history is similar to that user. By the collaborative filtering, even if there are a large number of users and a large volume of user preference information, actual estimation can be achieved.

Even if the user program view history of the similar users is remarkably similar to that of the particular user, those similar users do not necessarily view the same type of programs (their favorite programs) all the time. If the view history of the similar users is simply tracked, the system outputs a result including user-interesting information mixed up with uninteresting information. This results in providing unclear recommendation information.

[Patent Document 1] Japanese Patent Application Laid-Open No. 11-308547 (only JP)

[Patent Document 2] Japanese Patent Application Laid-Open No. 9-261609 (only JP)

[Non-patent Document 1] Sarwar, B., Karypis, G., Konstan, J., and Riedl, J., "Item-based Collaborative Filtering Recommendation" (In Proc. Of the $10^{th}$ International World Wide Web Conference (WWW10), pp. 285-295, May 2001) (http://www.aist-nara.ac.jp/~naoki-o/mct/mct30_November-19. 2002.doc)

SUMMARY OF THE INVENTION

An object of the present invention is to provide an excellent information processor, information processing method and computer program for supporting content processing including viewing, recording, recording reservation and reproducing of TV programs.

Still another object of the present invention is to provide an excellent information processor, information processing method and computer program for supporting content processing based on view history of a user.

Yet still another object of the present invention is to provide an excellent information processor, information processing method and computer program for supporting content processing for a particular recommended user based on a view history of each of a plurality of users.

Further object of the present invention is to provide an excellent information processor, information processing method and computer program for statistically obtaining a group of similar users whose view history is similar to that of a particular user based on users' program view history of a plurality of users, and for recommending the particular users easy-understanding contents based on a group of favorite programs of a group of similar users as a result of a user-based collaborative filtering process.

The present invention has been made in consideration of the above objects. According to the first aspect of the present invention, there is provided an information processor for supporting content processing for a recommended user, based on a view history of each of a plurality of users, the processor including a user's view history counter which counts the view history of each of the plurality of users;

a similar user's view history counter which acquires user information representing a user, as a similar user, whose view history is similar to a view history of the recommended user, and counts the view history of the similar user;

a collaborative filtering processor which registers view history information of the recommended user and view history information of the similar user in a collaborative filtering matrix, in which the view history information is mapped in association with each content per user, thereby executing a collaborative filtering process; and an information creator which creates content recommendation information to be provided to the recommended user, based on a result of the filtering process.

The collaborative filtering processor counts up a number of times the similar user has viewed or reserved each content based on the view history, in the collaborative filtering matrix, thereby obtaining a matching number for each content. The information creator creates the content recommendation information to be provided to the recommended user and representing a recommendation list including contents which are selected in order of matching number.

In this manner, the number of reservations or views done by the group of similar users is counted according to program, based on the view history, and the programs are recommended in the order of matching number. As a result of this, the program contents are recommended by the collaborative filtering process on a user basis.

The information creator may affix additional information of each content into the recommendation list representing the contents. In this case, the recommended contents may be provided as a result of the collaborative filtering, in accordance with not only the matching numbers for the program contents based on the view history information of the recommended user and the similar user but also the contents (category, etc.) of the programs.

Even if the similar user has the program view history that is remarkably similar to that of the recommended user, the similar user does not necessarily view the same program contents all the time. If the program view history of the similar users is simply tracked, user-interested programs and uninterested programs are mixed up. As a result of this, unclear recommendation information may possibly be provided.

The information processor according to the present invention sets a virtual user whose view history information represents a group of hit contents obtained based on a search condition for realizing a predetermined search topic, and registers the set virtual user into the collaborative filtering matrix. As a result of this, the view history of the similar user is not just simply tracked, but collaboratively filtered in association with the search topic.

The information creator may create the content recommendation information which are sorted in groups of contents, one group of which are hits obtained based on a search condition for realizing a predetermined search topic and other group of which are contents that does not satisfy the search condition.

The program contents shown in the recommendation list are thus sorted by search topic. As a result of this, the searched result corresponding to the search topic and user desired contents are not mixed up with any other information.

The information processor according to the present invention may further include a condition setting unit which sets a search condition for realizing the search topic.

For example, the search condition may be set in accordance with an input by the recommended user, or the search condition may be set based on a result of the collaborative filtering process before the virtual user is set.

The virtual user setting unit may register at least two virtual users in the collaborative filtering matrix at a same time. The virtual user setting unit may set a virtual recommended user whose view history information is included in the view history of the similar user of the recommended user and has a high matching number.

According to the second aspect of the present invention, there is provided a computer program in a computer readable form, the program executing, on a computer system, information processing for supporting content processing for a recommended user, based on a view history of each of a plurality of users, the computer program including:

a user's view history counting step of counting a view history of each of the plurality of users;

a similar user's view history counting step of retrieving user information representing a user, as a similar user, whose view history is similar to a view history of the recommended user, and counting the view history of the similar user;

a collaborative filtering processing step of registering the view history information of the recommended user and the similar user in a collaborative filtering matrix, in which the view history information is mapped in association with each content per user, thereby executing a collaborative filtering process; and an information creating step of creating content recommendation information to be provided to the recommended user, based on a result of the filtering process.

The computer program according to the second aspect of the present invention defines a computer program written in a computer readable form for realizing a predetermined process on a computer system. In other words, the computer program according to the second aspect of the present invention is installed in a computer system, thereby achieving a collaborative operation on the computer system and satisfying the same systematic effect as that of the information processor according to the first aspect of the present invention.

According to the present invention, there is provided an excellent information processor, information processing method and computer program for supporting content processing for a predetermined recommended user based on a view history of each of a plurality of users.

According to the present invention, a group of hit programs obtained based on a search condition for realizing a predetermined search topic are registered as attributes of a virtual user, in a collaborative filtering matrix. The result of the collaborative filtering process is displayed in association with the search topic. As a result of this, the user is provided with a clear result of the searched contents.

These and other objects, features and advantages of the present invention will be apparent from the following detailed description and the appended claims and drawings.

BRIEF DESCRIPTION OF THE DRAWINGS

FIG. 6 is a diagram showing a content recommendation information screen, and showing also the program content affixed to program titles listed in a recommendation list in the order of matching number;

FIG. 7 is a diagram exemplarily showing an example of the collaborative filtering matrix, in which an entry of a virtual user is registered and includes program history information regarding professional baseball programs;

FIG. 9 is a diagram exemplarily showing another configuration of a collaborative filtering matrix;

FIG. 10 is a diagram exemplarily showing a configuration of a content recommendation information screen which is formed based on a search result of a collaborative filtering process shown in FIG. 9;

FIG. 11 is a diagram exemplarily showing a configuration of a content-view supporting information screen including a button for group registration;

FIG. 13 is a diagram exemplarily showing a configuration of a content recommendation information screen (not sorted by search/registration label) which is formed based on a search result of the collaborative filtering process shown in FIG. 7;

DETAILED DESCRIPTION OF THE PREFERRED EMBODIMENTS

Preferred embodiments of the present invention will now be described with reference to the accompanying drawings.

Figure 1:
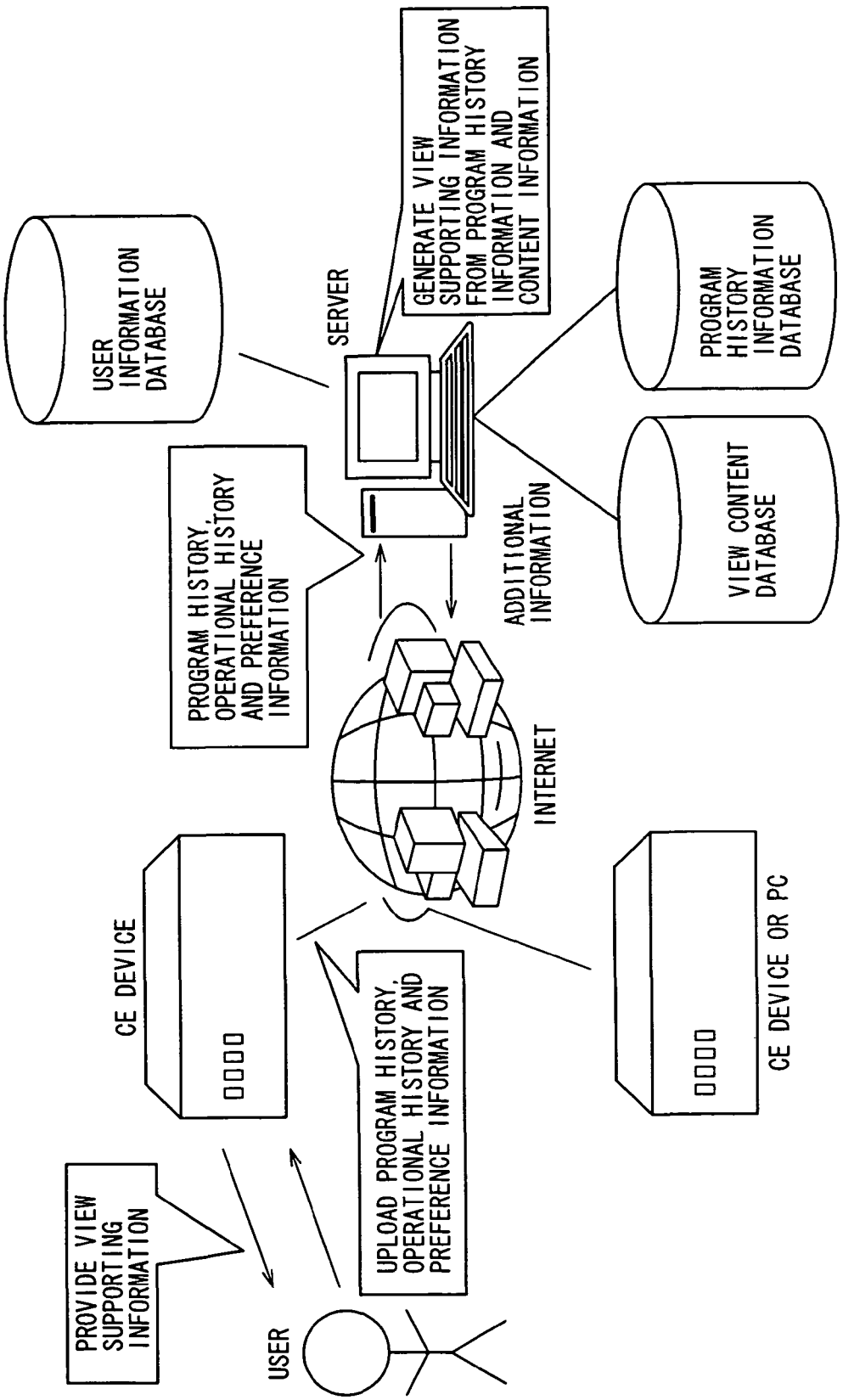
FIG. 1 is a diagram exemplarily showing a configuration of a content-view supporting system, which provides users with supporting information for viewing broadcast content, according to the present invention.

FIG. 1 exemplarily shows a configuration of a content-view supporting system, which provides users with supporting information for viewing the broadcast content, according to the present invention. This system executes a collaborative filtering process, and provides users with supporting information for viewing the broadcast content. Specifically, the system executes the collaborative filtering process for collaboratively filtering view history information regarding a view history of a group of "similar" (similar preference) users whose favorite broadcast content is similar to that of a particular user.

In the illustrated example of FIG. 1, a plurality of CE devices (hereinafter referred to as clients) and a server are mutually connected with each other through a wide area network (e.g. the Internet, etc.) or another form of communication path. Each of the CE devices is provided as a content-recording/reproducing unit which receives and records/reproduces the broadcast content on the user side. The server provides each CE device with value-added information, such as content recommendation information, etc.

The content-recording/reproducing unit as a client is incorporated with a CE device (e.g. a set-top box, a TV receiver or the like) or externally connected to a personal computer having a tuner system. The unit stores broadcast content in accordance with a user operation for recording reservation or a predetermined automatic recording reservation. The broadcast content is momentarily distributed from each broadcasting station.

During reception and recording of the broadcast content, the content-recording/reproducing unit acquires content ID information, operational information, view history information, user preference information, and other user profile information. The operational information represents operations regarding the recording/reproducing of the content. The view history information represents a user's view history including a "vote" on a broadcast program or the like.

The content-recording/reproducing unit is connected to a wide area network, such as the Internet, etc. The unit sends (uploads) user's view history information or user preference information to an information providing server built on the network. The unit also receives recommendation information regarding the broadcast content to be viewed, from the information providing server.

Specifically, such data to be uploaded by the client to the server is any of or a combination of a user operational history on the CE device, user view history information, and operational information (e.g. input information representing a vote or evaluation on a broadcast program). The user view history information represents a user operation, such as the recording operation, the recording reservation operation, the viewing operation, and the like. The operational information represents a user's favorite content. This operational information is obtained as a result of a predetermined operation using all of the above information. The user view history information is a combination of, for example, user ID information, content ID information (or any substitute information representing a broadcast time and broadcast channel for identifying the content) and recording status of the content (status representing whether the content has already been recorded or has already been reserved to be recorded). This user view history information is uploaded to the server side periodically or at predetermined intervals.

The server includes a content information database, a user information database and a program history information database, etc. The content information database manages EPG of the content to be broadcasted by each broadcasting station or program information corresponding to the EPG. The user information database manages user preference information and user profiles by each user. The program history information database manages, by each user, program information regarding the broadcast content viewed, recorded or reserved by each user. The program history information database also manages, by each user, an operational history regarding user operations required for the viewing, recording or reservation performed on a device.

The server uploads the user information or user program history information that are stored in each CE device through a network (or any other uplink), and counts the uploaded user information or the uploaded view history information regarding the viewed content. The server carries out a process for collaboratively filtering the program history information representing a group of similar users whose program view history information is similar to that of an arbitrary user. The server provides the users with supporting information for viewing the content, based on a result of the searched content.

In this embodiment, during the collaborative filtering process, the server registers, in the matrix of the collaborative filtering engine, a group of hit programs as attributes of a virtual user. The group of hit programs are found based on a search condition(s) for realizing the search topic. The server displays the result of the collaborative filtering process together with the search topic, thereby providing the user with a clear result of the searched content(s). The content searching operation performed in accordance with the collaborative filtering process will specifically be described later.

Figure 2:
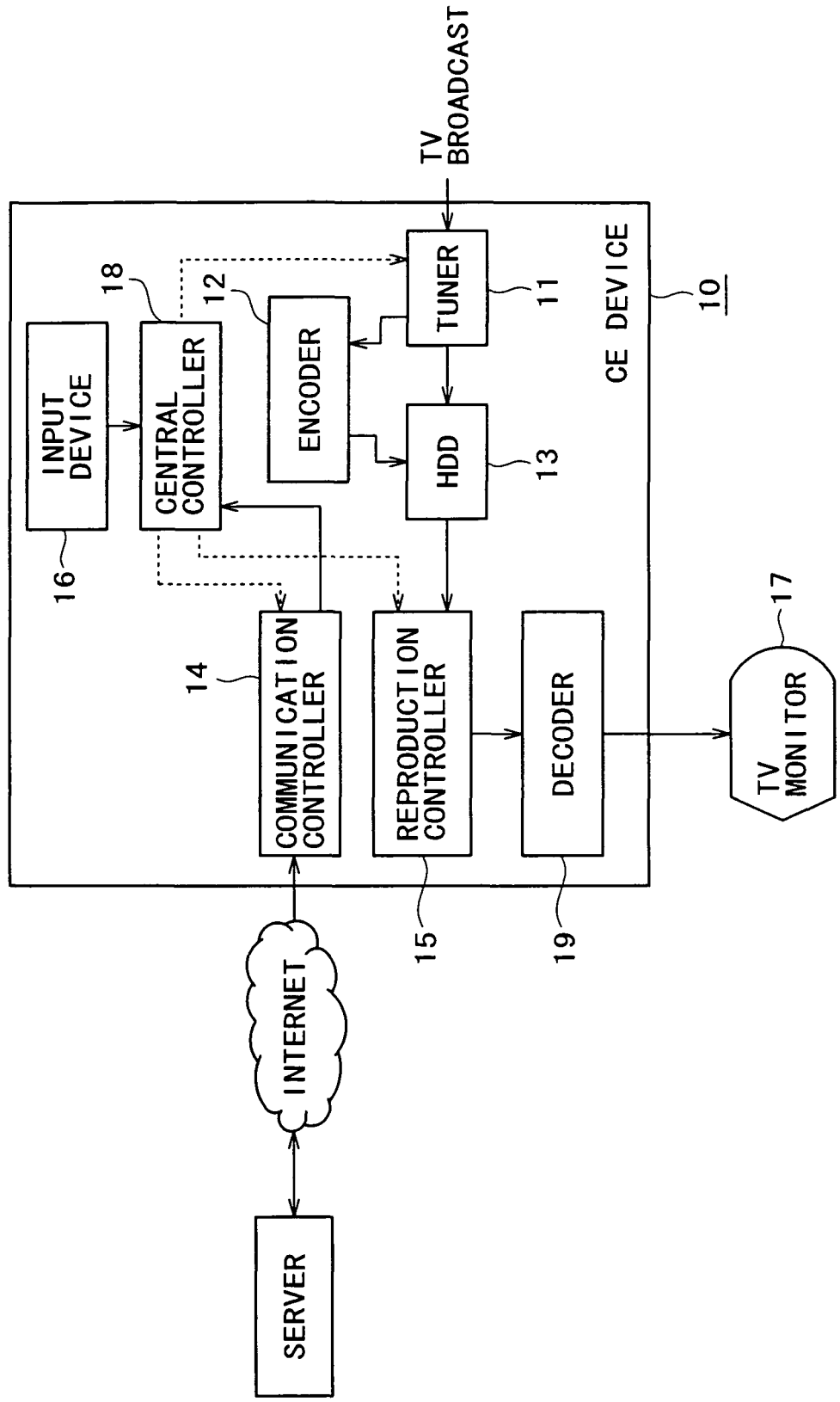
FIG. 2 is a diagram exemplarily showing a system configuration of a client device that records and reproduces the content.

FIG. 2 exemplarily shows a system configuration of a client device that records and reproduces the content. The client device is incorporated with a CE device, such as a set-top box, a TV receiver, etc. or externally connected to a personal computer having a tuner system. The client device stores the broadcast content distributed momentarily from each broadcasting station, in accordance with user operations for recording reservation setting or predetermined automatic recording reservation procedures (as described above).

The CE device 10 includes a tuner 11, an encoder 12, a hard disk device (HDD) 13, a communication controller 14, a reproduction controller 15, an input device 16, a TV monitor 17 and a decoder 19. Under the general control of a central controller 18, the CE device 10 executes an operation for viewing the content (including the receiving, recording and reproducing of the content), and acquires the user program history information based on a user operation on the device.

In response to a user operation (including a remote operation) through the input device 16, the CE device 10 activates operations: for receiving the TV broadcast or the EPG; recording the received broadcast content; and reproducing the recorded content. Needless to say, the CE device 10 may activate additional operations (fast-forwarding, rewinding, pausing the content) during the reproducing of the recorded content, or active an operation for deleting the recorded content.

A broadcast wave received by an antenna (not illustrated) is supplied to the tuner 11. The broadcast wave may be any of a ground wave, a satellite wave, digital broadcast, and analog broadcast. The tuner 11 tunes to a predetermined channel to receive the broadcast wave, in accordance with an instruction from the user through the input device 16.

In response to an instruction from the user through the input device 16, the communication controller 14 accesses a predetermined server on the broadband Internet to upload the user program history information acquired by the CE device 10 to the server or to download the supporting information for viewing the content or any other information content.

The CE device 10 includes the HDD 13 as a content-storage unit for recording and reproducing the content to be carried by a broadcast wave. The HDD 13 is a storage unit of a magnetic recording system. Generally, several magnetic media as recording media are contained in the drive unit, and rotate in accordance with a spindle motor at high speed. Onto the media, a magnetic substance with nickel or phosphorus plated thereover is applied. The magnetic head scans over the surface of the rotating media along their radius direction. This results in generating magnetism corresponding to data and writing the data on the media, or reading data from the media. According to the present invention, it is not limited to the HDD, but any other kind of medium can be used for recording/reproducing the content.

In the case of analog broadcast, the broadcast content received by the tuner 11 is encoded by the encoder 12 in an MPEG (Moving Picture Experts Group) format, and stored in the HDD 13. In the case of digital broadcast, the content is received in its encoded form so as to be stored in the HDD 13 as it is.

In response to a content-reproduction instruction sent from the user through the input device 16, the reproduction controller 15 reads out predetermined content from the stored contents of the HDD 13, and controls the content to be reproduced.

The decoder 19 decodes the recorded content that is in the encoded form. The TV monitor 17 outputs the decoded voice signal and displays the decoded video signal thereon.

Figure 3:
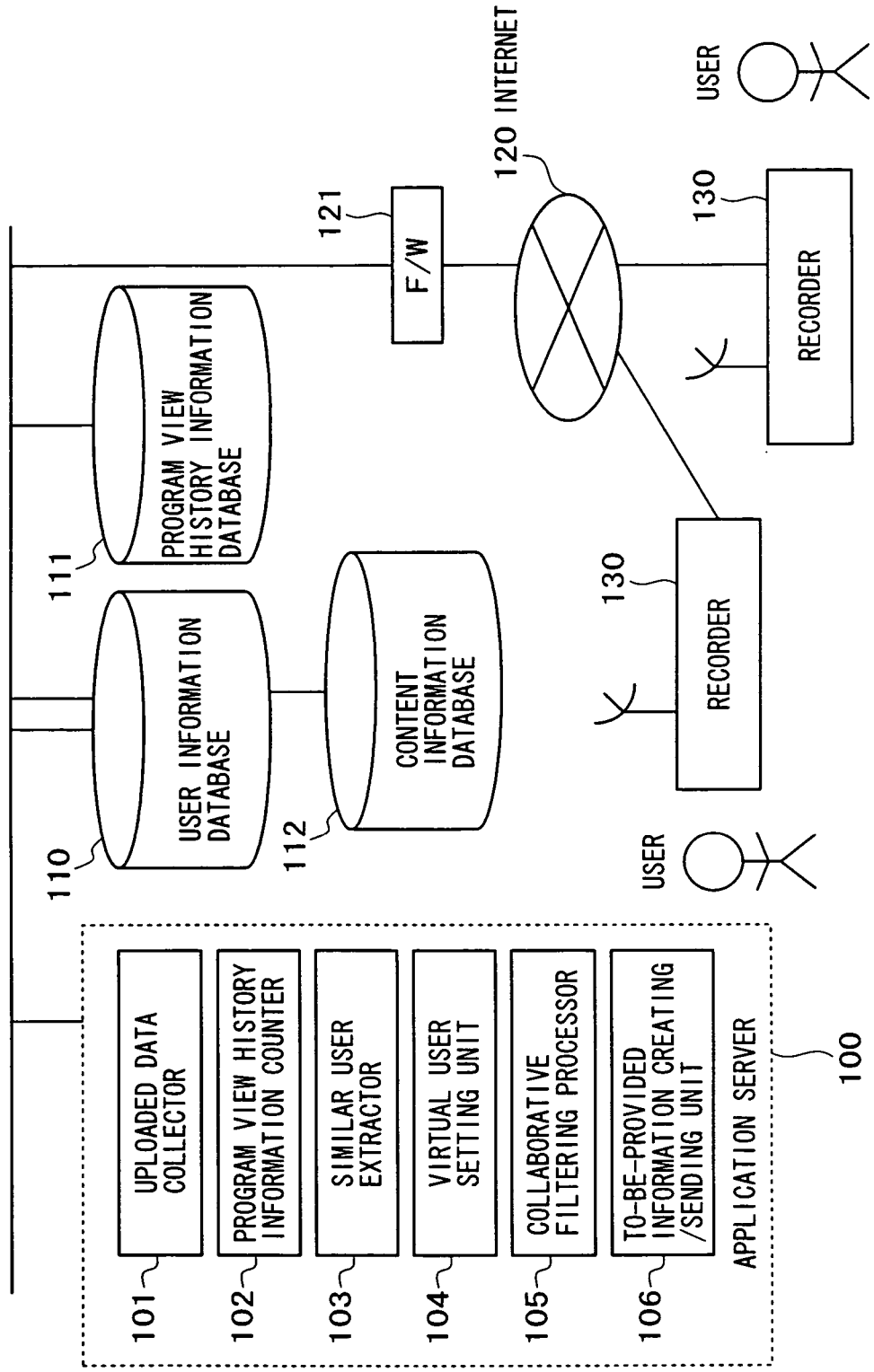
FIG. 3 is a diagram exemplarily showing a system configuration of a server device.

FIG. 3 exemplarily shows a system configuration of the server. The server is installed on a wide area network, such as the Internet, etc. The server includes an upper link with the client device, such as the CE device, etc., creates supporting information for viewing the content based on the collaborative filtering process, and provides the created information to each user.

The server is connected to the Internet 120 through a firewall (F/W) 121, and is composed of an application server 100 and a plurality of databases 110 to 112.

A user information database 110 manages account information and user profile information regarding the user of each CE device connected through the Internet 120. A program view history information database 111 manages a user's program view history information (including operational information representing operations not only for viewing the content, but also for recording reservation, recording, reproducing, voting and evaluating the content, etc.) acquired by the CE device of each user. A content information database 112 manages related information regarding the content to be broadcasted by each broadcasting station.

The application server 100 includes an uploaded data collector 101, a program view history information counter 102, a similar user extractor 103, a virtual user setting unit 104, a collaborative filtering processor 105 and a to-be-provided information creating/sending unit 106. The application server 100 carries out a collaborative filtering process for collaboratively filtering view history information of the group of users whose favorite broadcast content is similar to that of the user, and carries out a process for providing the user with the supporting information for viewing the content.

The upload data collector 101 executes a process for collecting data uploaded from each CE device. Specifically, the data to be uploaded from each client to the server includes or is a combination of user operational history information, program history information (i.e. user's program view history information), and operational information (e.g. input information regarding a "vote" on a broadcast program or evaluation thereof). The user operational history information represents a user operation performed on the device. The program history information represents a program that the user has viewed, recorded or reserved to record. The operational information is output information of a predetermined process using the above information and represents the user preference.

The program view history information counter 102 counts the user's program view history information uploaded from each CE device, and registers the counted information in the program view history information database 111.

The similar user extractor 103 extracts similar (similar preference) users whose program view history is similar to that of a recommended user who is a requester of the supporting information for viewing the content. The virtual user setting unit 104 sets, as attributes of a virtual user, a group of hit programs obtained based on a search condition for realizing a search topic specified by the recommended user. The collaborative filtering processor 105 maps the program view history information of the similar users or virtual user in the collaborative filtering matrix, and executes a collaborative filtering process corresponding to the search topic.

The to-be-provided information creating/sending unit 106 generates supporting information to be provided to the recommended user to view the content, based on a searched result of the collaborative filtering process. The to-be-provided information creating/sending unit 106 sends the created information to the recommended user through the Internet 120 (or any other downlink) so as to support the user to select which content to view. In this embodiment, the supporting information for viewing the content represents the searched result in the collaborative filtering matrix. In the matrix, the information is sorted according to the search condition for realizing the search topic and any other condition. This avoids the loss of the user desired information. The configuration of a content-view supporting information screen will specifically be described later.

Operations of the content view supporting system according to this embodiment will now be explained.

Figure 4:
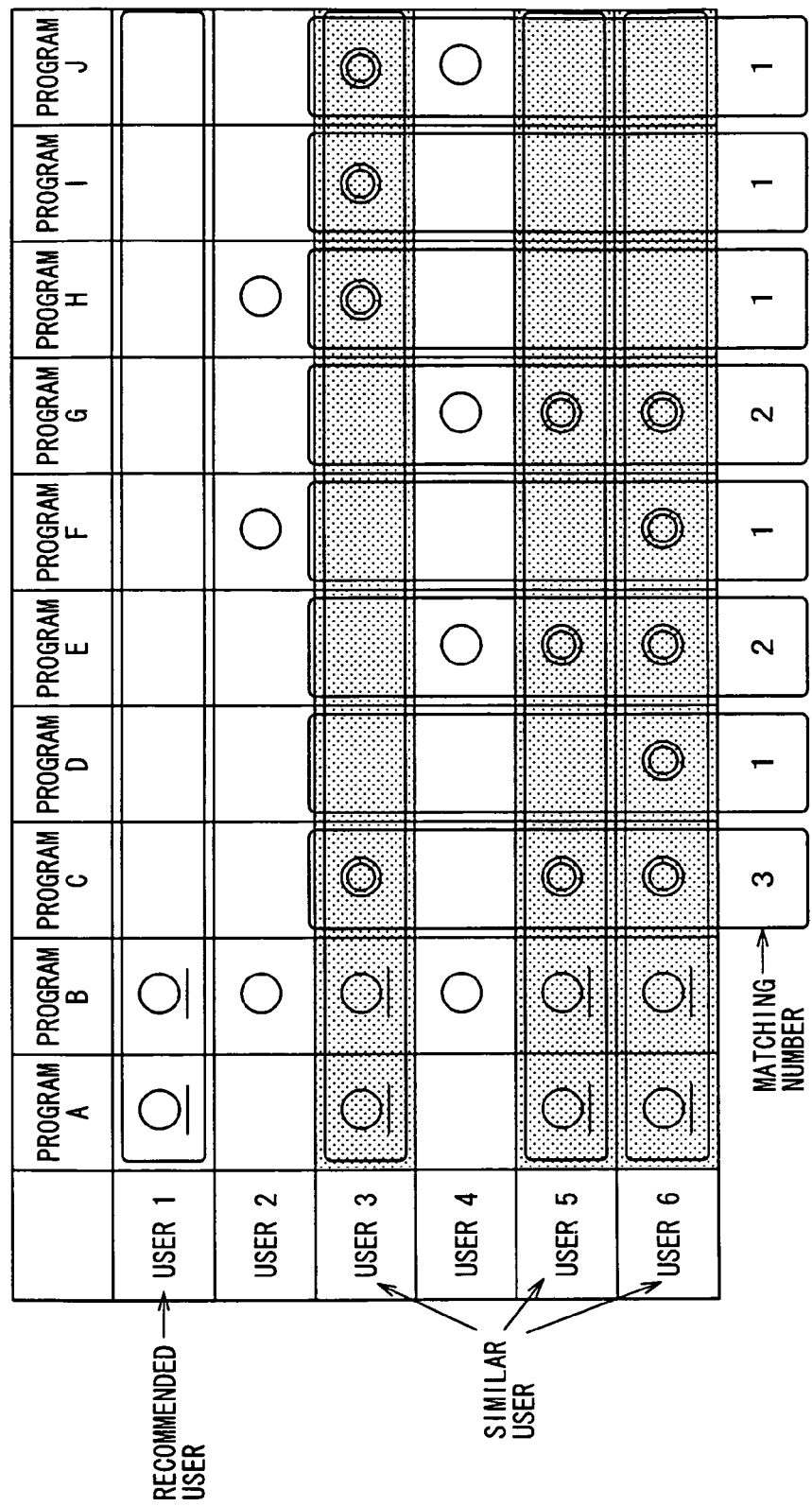
FIG. 4 is a diagram for explaining a mechanism for obtaining a recommended program(s) for a recommended user, using a collaborative filtering matrix.

FIG. 4 shows a mechanism for obtaining a recommended program(s) for a particular user (now referred to as a user 1, but hereinafter referred to as a recommended user), using a collaborative filtering matrix. The illustrated collaborative filtering matrix is shown in the form of a table showing a user's program view history according to each program. This table shows the user's program view history of similar users that is similar to the program view history of the recommended user.

In the same illustration, circles represent user-reserved programs. In the illustrated example, it is apparent that the user 1 has reserved programs A and B, like the similar users. These similar users of this case are users 3, 5 and 6 who have reserved the programs A and B as well.

In the same illustration, double circles represent those programs that the similar users have reserved. For each corresponding program, the number of reservations made among the similar users is counted up. The counted number is set as a matching number. In the illustrated example, all of the similar users have reserved program C, and the matching number for the program C is the highest among other matching numbers. Subsequently, the matching number for programs E and G is 2, and the matching number for programs D, F, H, I and J is 1. Screen information represents a list of program titles shown in this recommendation order, for example. This screen information is distributed to the CE device of the recommended user, as recording reservation supporting information.

In this manner, the number of reservations made among the similar users is counted up according to each program. The obtained matching numbers are referred when providing the user with the recommended programs, thereby realizing content recommendation on per user basis through the collaborative filtering.

As a result of the collaborative filtering, the recommended program content can be provided based on the matching numbers of user operations performed by both the recommended user and the similar users. In addition, the recommended program content can be provided based on information affixed to the program content (such as category, etc.) or any other content.

Figure 5:
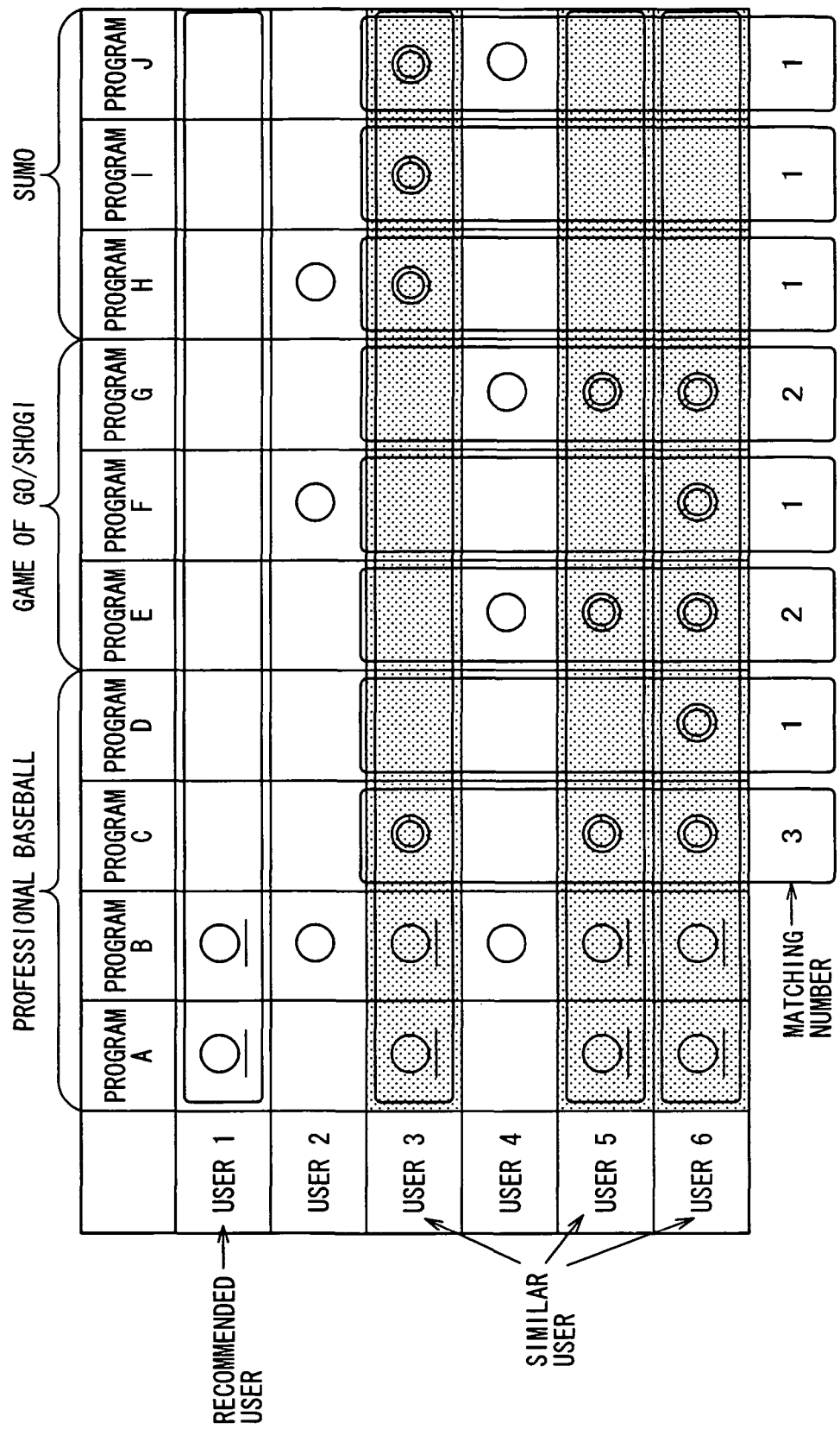
FIG. 5 is a diagram showing the collaborative filtering matrix of FIG. 4, showing the content of each program affixed thereto.

FIG. 5 shows a result of a collaborative filtering process using the collaborative filtering matrix show in FIG. 4. The result is shown with the content (favorite type of content) of each program affixed thereto. FIG. 6 exemplarily shows the configuration of a content-view supporting information screen showing the result of the collaborative filtering process. As illustrated in FIG. 6, the recommended contents are listed in the order of matching number, and the content information of the programs is shown according to each program title (see FIG. 6).

In the examples shown in FIG. 5 and FIG. 6, in addition to the baseball-related programs, "the game of Go/Shogi"-related programs are included in those recommended programs obtained by the collaborative filtering. Such recommended programs are acquired for the recommended user who has reserved two baseball-related programs.

Even if those similar users have the program view history that is remarkably similar to that of the recommended user, the similar users do not necessarily view the same program contents all the time. If the program view history of the similar users is simply tracked, user-interested programs and uninterested programs are mixed up. As a result of this, unclear recommendation information may possibly be provided.

In the above example, it is obvious that many of those who have reserved two baseball-related programs have also reserved "the game of Go"/"Shogi"-related programs. However, as long as the user 1 is not interested in "the game of Go"/"Shogi", the baseball-related programs are mixed up with the user-uninterested information (the game of Go/Shogi-related programs), resulting in showing an unclear screen, as illustrated in the recommendation information of FIG. 6. In other words, if the view history of similar users that is quite similar to that of the user 1 is simply acquired, it may result in providing unclear information.

The below describes an example of registering a virtual user in the collaborative filtering matrix. Note that this virtual user has program history information representing a group of hit programs obtained based on a search condition for realizing a predetermined search topic. The search topic is set, for example, by the recommended user.

FIG. 7 exemplarily shows a registered entry of the virtual user whose program view history information represents professional baseball-related programs, in the collaborative filtering matrix. Those professional baseball-related programs, as the search topic, may be chosen by the registrant, or may be the searched result of professional baseball programs. For example, a search condition (e.g. "night game", "baseball", "team name" or "professional baseball") and an exclusion condition (e.g. "high school baseball" or "major league") are set, thereafter executing the searching.

As shown in the illustrated collaborative filtering matrix, the reservation numbers of the user 1 is counted by the counting process (as described above). As a result of this, the matching numbers change as shown in the illustration. That is, the virtual user and all of the similar users have reserved the program "C", and the matching number therefor is 4, that is the highest number among the rest of the matching numbers. Subsequently, the matching number for the programs "D", "E" and "G" is 2, and the matching number for the programs "F", "H", "I" and "J" is 1. Screen information represents program titles listed in the recommendation order, for example. This screen information, as recording reservation supporting information, is distributed to the CE device of the recommended user.

Figure 8:
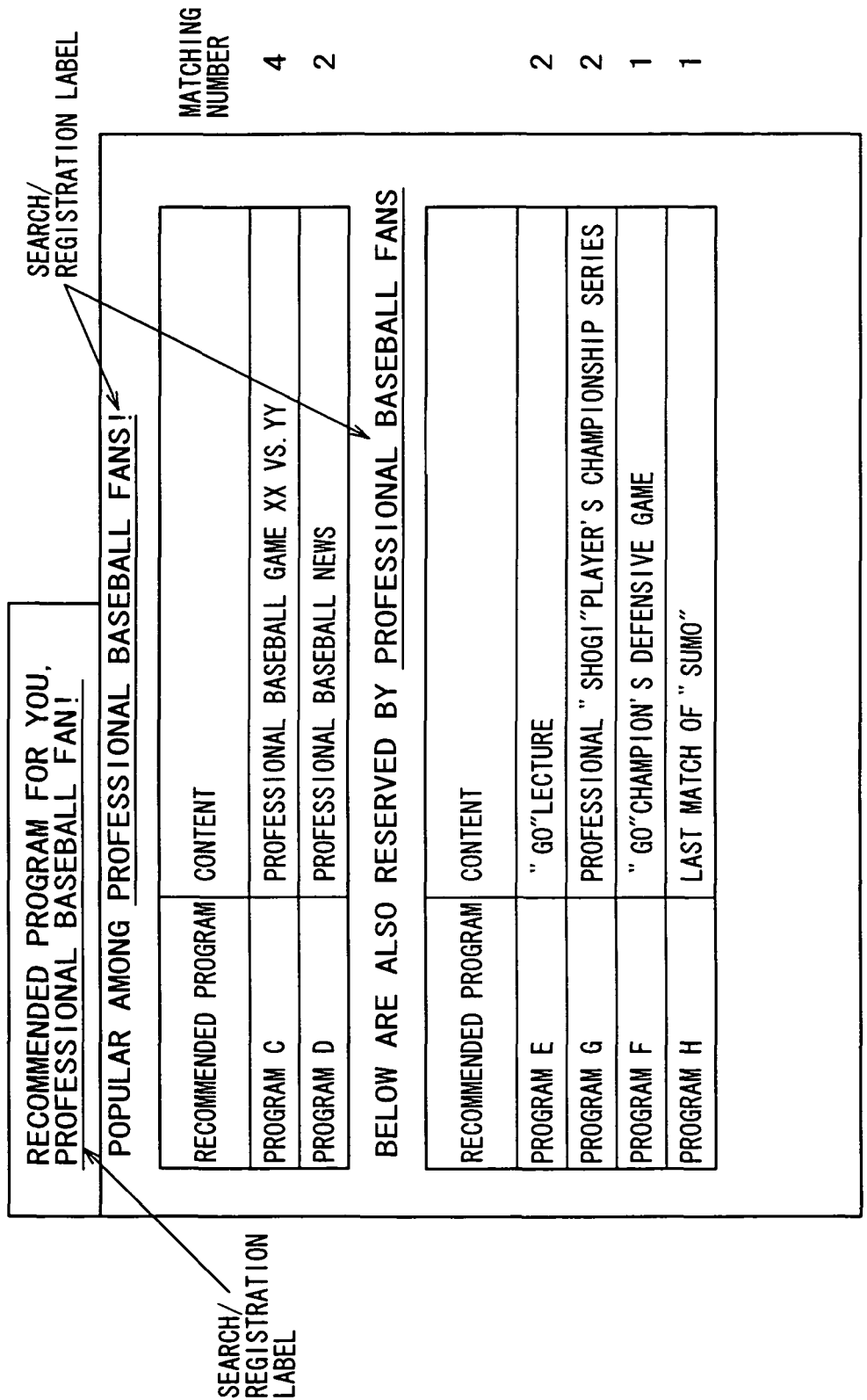
FIG. 8 is a diagram exemplarily showing a configuration of the content recommendation information screen (when sorted by search/registration label) which is formed based on a search result of a collaborative filtering process shown in FIG. 7.

FIG. 8 exemplarily shows a configuration of a content recommendation information screen. This content recommendation information screen is formed based on the searched result of the collaborative filtering process, using the collaborative filtering matrix of FIG. 7. The content recommendation information screen shown in FIG. 8 resembles the example shown in FIG. 6 in an aspect that the program content is affixed to each program title included in the recommendation list shown in the order of matching number. In the case of FIG. 8, however, the recommendation list separately includes two groups of programs. One group of programs (i.e. corresponding to the virtual user) are derived from the hits based on a search condition for realizing the search topic and the other group of programs are programs that does not satisfy the search condition.

In this way, the programs in the recommendation list are sorted according to the search topic. This prevents that the searched result corresponding to the search topic and user desired contents are mixed up with any other information.

In the configuration example of the content recommendation information screen shown in FIG. 8, the upper row shows the recommended contents corresponding to the search topic, i.e. the professional baseball-related programs (or the search result) in the order of matching number. In addition, the lower row shows other programs that does not satisfy the search topic in the order of matching number.

In the illustrated example, the matching number for the program "C" corresponding to the search topic is unexpectedly equal to that for the programs "E" and "G" (not satisfying the search topic). However, even if the matching number for the program "C" is lower than that for the programs "E" and "G", the program "C" is shown in the upper row, as a program corresponding to the search topic.

In the example shown in FIG. 8, the content recommendation list shows subtitles like "Popular among professional-baseball fans!" and "Programs below are reserved by professional-baseball fans!", both in the upper and lower rows. The word underlined in the subtitles represents a "search/registration label" corresponding to the set search topic (favorite type of content). Other than that, program information corresponding to a search condition and/or registered topic (e.g. a music lover, a classic music lover, etc.) can be output.

Needless to say, the program information is not necessarily sorted according to search/registration label in the recommendation list. The result of the collaborative filtering process can be listed and displayed as it is, in accordance with the matching numbers. FIG. 13 exemplarily shows a content recommendation information screen when the result of the collaborative filtering process is shown as it is.

Figure 14:
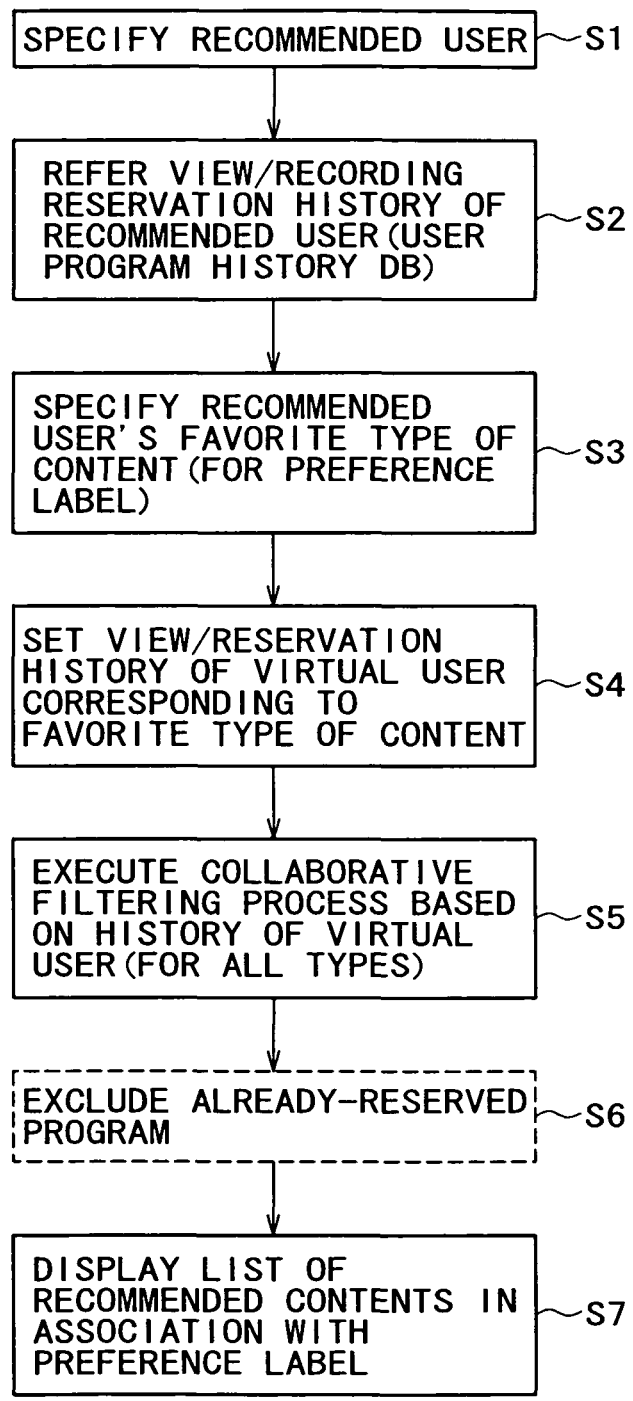
FIG. 14 is a flowchart for explaining procedures for creating content recommendation information by a collaborative filtering process using a plurality of virtual users.

FIG. 14 is a flow chart showing procedures for creating content recommendation information by the collaborative filtering process using the entry of the virtual user.

The server specifies a recommended user (Step S1). For example, when the server provides the user with the content recommendation information on demand, the server specifies a requesting user as a recommended user.

After that, the server acquires a user's program view history representing the recommended user's history of views and representing a reservation history of the broadcast content, from the program view history information database 111 (Step S2).

The server specifies the recommended user's favorite type of content (Step S3). Note that the favorite type of content, in this case, is the source of the search/registration label, such as "professional baseball fan", etc. The blow is a means for specifying the recommended user's favorite type of content.

(1) Of those contents included in the recommended user's program view history in a predetermined period of time (e.g. for the past year), the server specifies the type of most-frequently reserved/viewed contents, as the favorite type of content.

(2) The server specifies a predetermined number of candidate contents from the frequently-reserved/viewed contents from the history information, and instructs the user to pick up one of them.

The server sets a user's program view history of a virtual user whose attribute corresponds to the favorite type of content (Step S4). Specifically, the server searches the content information database 112 for the program content corresponding to the favorite type of content. Subsequently, the server sets the searched program content as the user's program view history of the virtual user. Note that some favorite type of content (e.g. "professional baseball", "drama", etc.)

that is estimated in advance may be formed and stored in the program view history of the virtual user beforehand.

The server carries out a collaborative filtering process for all types of program contents, based on the program view history of the virtual user (Step S5). Specifically, the server carries out the collaborative filtering process in accordance with the procedures as will be described below.

(1) The server selects similar users whose program view history is similar to that of the recommended user, from the user information database 110 and the program view history information database 111. In this case, the user program view history of the similar users may be similar to that of the recommended user, in terms of all types of the contents or in terms of a particular type of content.

(2) In the collaborative filtering matrix, the server maps the user's program view history of the similar users according to program. In this case, the user's program view history of all types of contents is mapped without restricting to any particular favorite type of content.

(3) Further, the server registers the entry of the virtual user in the collaborative filtering matrix.

(4) In the collaborative filtering matrix, the server counts up the number of users who have reserved or have viewed each program as recorded in the program view history, and sets the counted numbers as matching numbers. Further, the server outputs the searched result representing the recommendation list showing program contents which are arrayed in the descending order of matching number.

Because there is no need to recommend any of those programs that the recommended user has already reserved, the server may exclude such programs from the recommendation list (Step S6). However, the process for determining whether to exclude such already-reserved programs is not necessarily performed.

The server arranges the program contents according to search/registration label corresponding to the favorite type of content, creates content recommendation information including a list of recommended contents, and provides the user with the created information (Step S7).

In the example shown in FIG. 7, only one kind of virtual user corresponding to the search topic is registered in the collaborative filtering matrix. However, two or more virtual users can be registered in the collaborative filtering matrix at the same time.

In the case where a plurality of virtual users are arranged, those virtual users may have a search/registration label included in the information of the similar users of the recommended user. This search/registration label corresponds to program information with a high matching number. That is, such virtual users have view history information representing a program(s) with a high matching number.

FIG. 9 exemplarily shows another configuration of a collaborative filtering matrix. The illustrated matrix has the same configuration as that of FIG. 7. In FIG. 9, however, a searched result of the professional baseball programs (or registered professional baseball-related program) is set as an attribute of a virtual recommended user and the matching numbers are recounted. In this case, the matching numbers for the programs "A" and "B" (the searched result of the professional baseball programs) are obtained. In the illustrated example, a threshold value used for selecting the similar users is 2.

In the illustrated collaborative filtering matrix, the matching numbers will be updated, after the matching numbers in association with the user 1 are counted up as described above. That is, all similar users, the virtual user and the virtual recommended user have reserved the programs "A" and "B". In this case, the highest matching number of 5 is obtained.

Subsequently, the matching number for the program "C" is 4, the matching number for the programs "D", "E" and "G" is 2, and the matching number for the programs "F", "H", "I" and "J" is 1. Screen information represents program titles listed in this recommendation order, for example. This screen information as recording reservation supporting information is distributed to the CE device of the recommended user.

FIG. 10 exemplarily shows the configuration of a content recommendation information screen. This information screen is formed based on the search result of the collaborative filtering process using the collaborative filtering matrix shown in FIG. 9. As shown in FIG. 10, the content recommendation information screen has the same configuration as that shown in FIG. 8 in two ways. First, the program content is affixed to each program title shown in the order of matching number in the recommendation list. Second, the recommendation list is made up of two groups of programs, one group of which are derived from the hits based on a search condition for realizing the virtual user (i.e. the search topic) and the other group of which are those programs that does not satisfy the search condition.

The content recommendation list shows subtitles like "Popular among professional-baseball fans!" and "Programs below are also reserved by professional-baseball fans", respectively in the upper and lower rows. The word underlined in the subtitles represents a "search/registration label" corresponding to the set search topic (favorite type of content).

Figure 15:
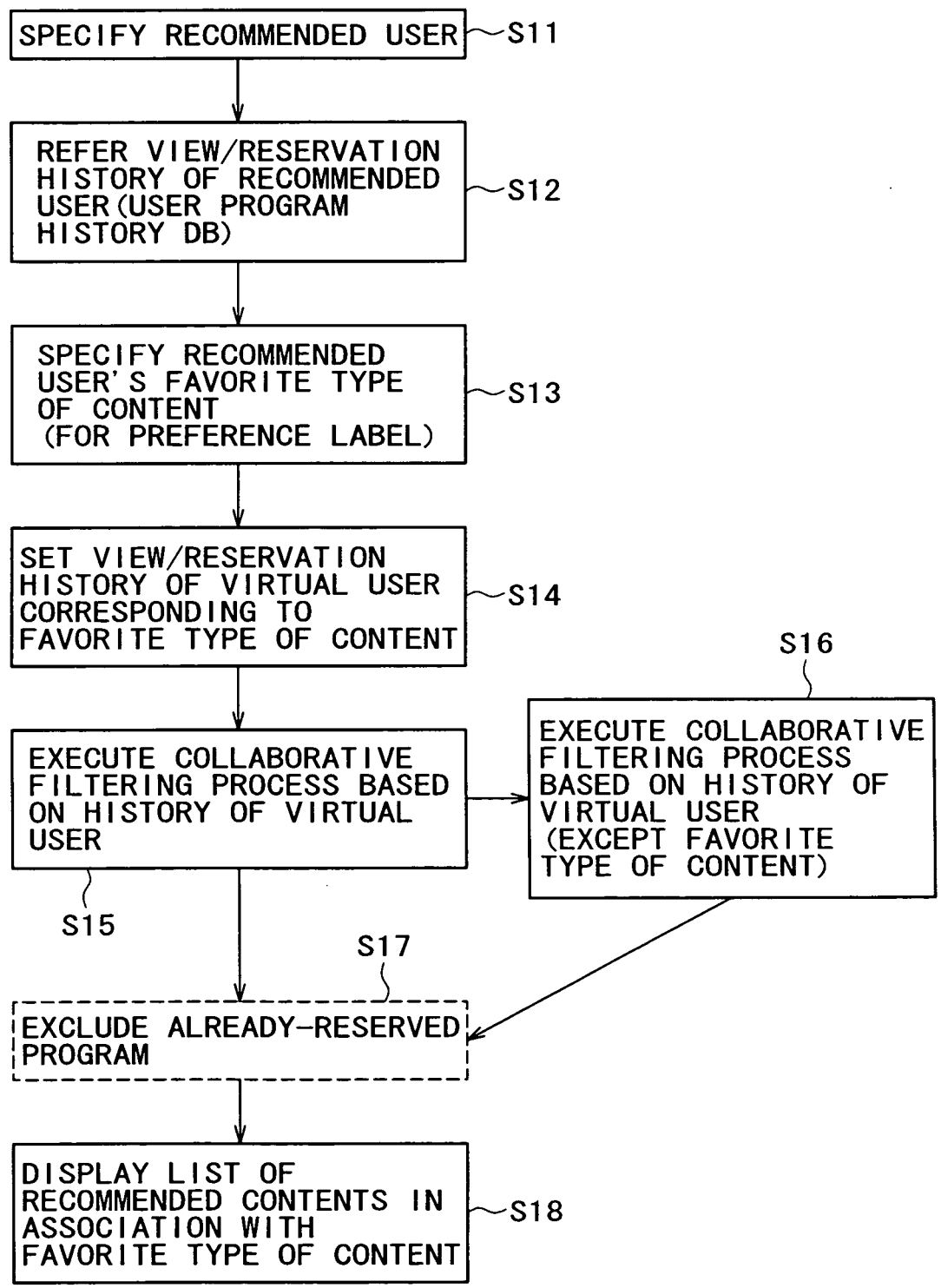
FIG. 15 is a flowchart for explaining procedures for creating content recommendation information by a collaborative filtering process using a plurality of virtual users.

FIG. 15 is a flowchart for explaining procedures for creating content recommendation information in accordance with the collaborative filtering process using a plurality of virtual users. In this case, view history information of virtual users correspond both to the favorite type of program contents and for the non-favorite type of contents.

The server specifies a recommended user (Step S11). For example, in the case where the server provides the user with content recommendation information on demand, it specifies a requesting user as a recommended user.

The server acquires a user's program view history representing the recommended user's view history and recording reservation of the broadcast content from the program view history information database 111 (Step S12).

The server specifies the recommended user's favorite type of content (Step S13). Note that the favorite type of content, in this case, is the source of the search/registration label, such as "professional baseball fan", etc. The blow is a means for specifying the recommended user's favorite type of content.

(1) Of those contents included in the recommended user's program view history in a predetermined period of time (e.g. for the past year), the server specifies the type of most-frequently reserved/viewed contents, as the favorite type of content.

(2) The server specifies a predetermined number of candidate contents from the frequently-appeared contents from the history information, and instructs the user to pick up one of them.

The server sets a user's program view history of a virtual user whose attribute corresponds to the favorite type of content (Step S14). Specifically, the server searches the content information database 112 for the program content corresponding to the favorite type of content. Subsequently, the server sets the searched program content as the user's program view history of the virtual user. Note that some favorite type of content (e.g. "professional baseball", "drama", etc.) that is estimated in advance may be formed and stored in the user's program view history of the virtual user beforehand.

The server carries out a collaborative filtering process for the favorite type of program contents, based on the user's program view history of the virtual user (Step S15). Specifically, the server carries out the collaborative filtering process in accordance with the procedures as will be described below.

(1) The server searches for similar users whose program view history is similar to that of the recommended user, from the user information database 110 and the program view history information database 111. In this case, the user program view history of the similar users may be similar to that of the recommended user, in terms of all types of the contents or in terms of a particular type of content.

(2) In the collaborative filtering matrix, the server maps the user's program view history of the similar users according to program. In this case, the user's program view history of all types of contents is mapped without restricting to any particular favorite type of content.

(3) Further, the entry of the virtual user is registered in the collaborative filtering matrix.

(4) In the collaborative filtering matrix, the server counts up the number of users who have reserved or have viewed each program corresponding to the favorite type of program content, as recorded in the program view history, and sets the counted numbers as matching numbers. Further, the server outputs the searched result representing the recommendation list showing program contents which are arrayed in the descending order of matching number.

Subsequently, the server carries out the same collaborative filtering process for non-favorite type of program contents, based on the user's program view history of the virtual user (Step S16).

In this case, because there is no need to recommend any of those programs that the recommended user has already reserved, the server may exclude such programs from the recommendation list (Step S17). However, the process for determining whether to exclude such already-reserved programs is not necessarily performed.

The server arranges the program contents according to search/registration label corresponding to the favorite type of content, creates content recommendation information including a list of recommended contents, and provides with user with the created information (Step S18).

The user can perform user group registration through the content-view supporting information shown in FIG. 10. FIG. 11 exemplarily shows a configuration of a content-view supporting information screen including a button for user group registration.

For example, the term "professional baseball" is the search/registration label corresponding to the search topic (i.e. the virtual user) or the recommendation topic representing the search result, a button of "Register in group of professional baseball fans" is provided, as illustrated in FIG. 11.

If the user click on this registration button, a registration request is sent to the server. Then, the server carries out a group registration process for registering this user. The server generates an operational screen for registered group members, and sends the generated screen to the user.

Figure 12:
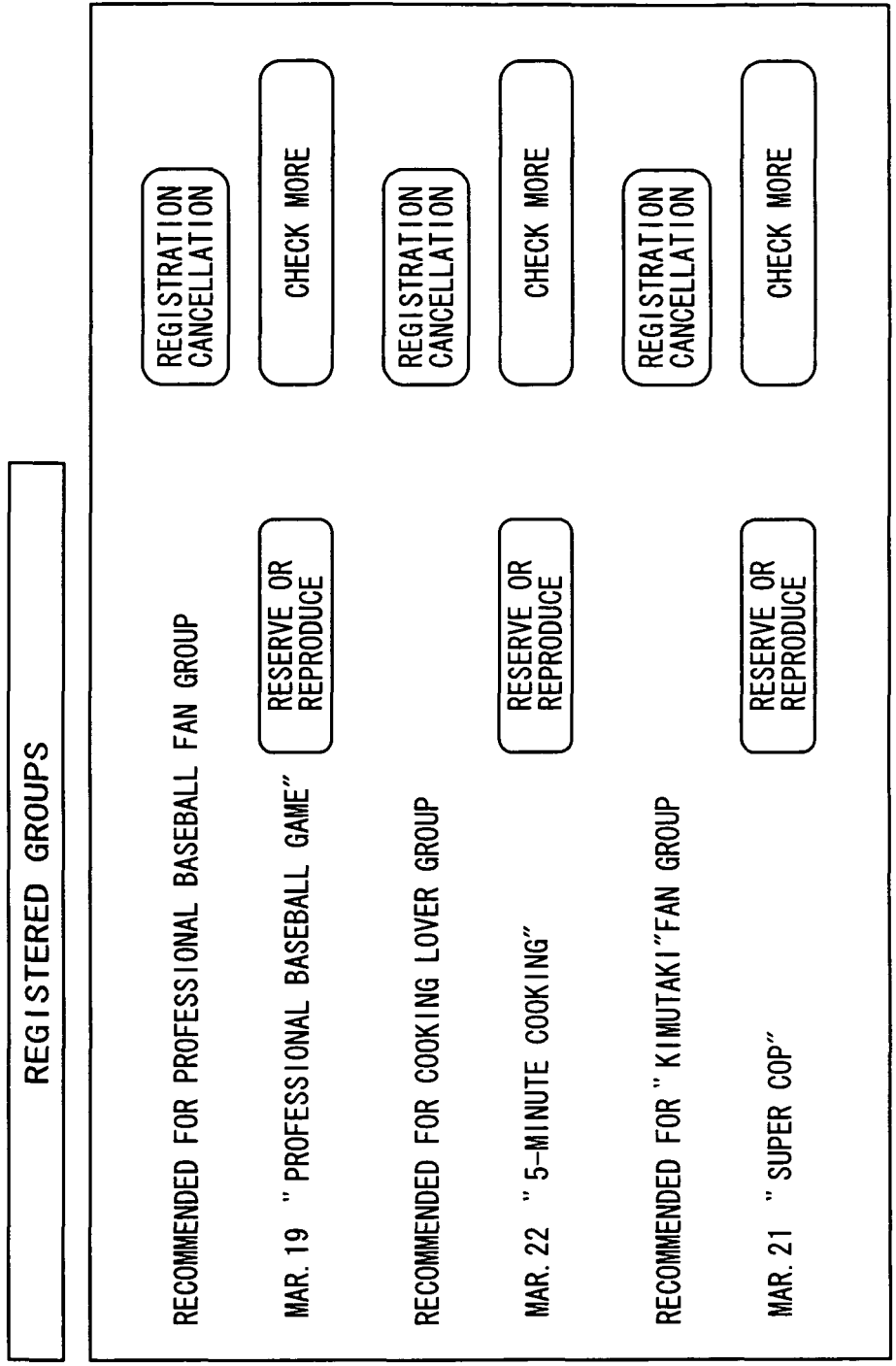
FIG. 12 is a diagram exemplarily showing a configuration of an operational screen for registered group members.

FIG. 12 exemplarily shows the configuration of the operational screen for the registered group members. In the illustrated example, the operational screen shows recommended contents and their operational buttons in association with not only a newly-registered group, but also already-registered groups.

A reservation/reproduction button for reserving/reproducing a recommended content is provided in association with each registered group. Upon selection of the reservation/reproduction button, the CE device 10 is activated for performing a process for recording reservation or reproducing the recommended content (only if the content has already been recorded).

A "Check more" button is provided for each registered group. Upon pressing this button, a search request is sent to the server. In response to this search request, the server carries out the above-described collaborative filtering process based on a corresponding search topic. The server generates the content-view supporting information screen shown in FIG. 11 using the search result, and provides the CE device 10 with the generated screen information.

A "Registration cancellation" button is provided in association with each registered group. Upon pressing this "registration cancellation" button, a request for cancellation of a registration from the registered group is sent to the server. In response to this request, the server carries out a process for canceling the user from the registered group.

The server may set some item (e.g. a baseball player's card) or an advertisement in connection with the search topic on the operational screen of FIG. 12 (not illustrated in FIG. 12). In addition, the server may estimate the user's taste based on the registered group(s) shown in FIG. 12, and set some item or an advertisement in connection with the estimated user's taste on the same screen.

Figure 16:
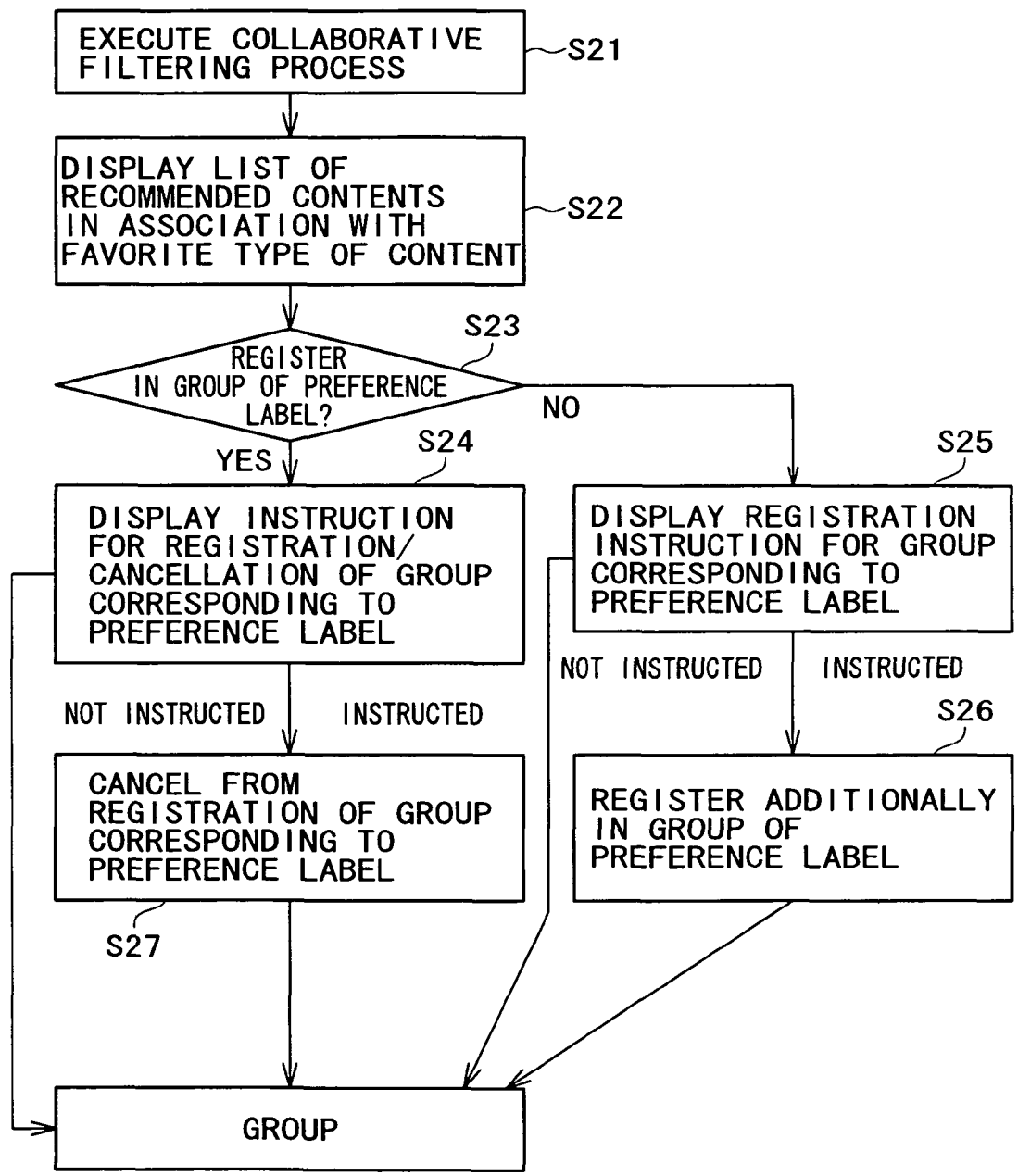
FIG. 16 is a flowchart for explaining procedures for performing group registration for a user.

FIG. 16 is a flowchart for explaining procedures for registering the user in a particular group.

The server carries out a collaborative filtering process using the collaborative filtering matrix (Step S21). In this matrix, the similar users' program view history is mapped according to each program. The server arranges the program contents according to search/registration label corresponding to the favorite type of content, creates content recommendation information including a list of recommended contents, and provides the user with the created information (Step S22).

In this case, the server determines whether the recommended user has already been registered in a group related to the search/registration label corresponding to the favorite type of content (Step S23).

In the case where the recommended user has not been registered yet, the server displays an instruction for group registration in association with the search/registration label, on the content view supporting information screen, as shown in FIG. 11 (Step S24). In this case, if the user sends an instruction for group registration, the server adds and registers the recommended user in the group (Step S25).

In the case where the recommended user has already been registered in the group, the server displays instruction information for cancellation of a registration from the group in association with the search/registration label, on the operational screen regarding the registered groups, as shown in FIG. 12 (Step S26). If the user sends an instruction for cancellation of a registration from the group, the server deletes the recommended user from the group (Step S27).

INDUSTRIAL APPLICABILITY

While the foregoing description represents the present invention by referring to particular preferred embodiments, it will be obvious to those skilled in the art that various changes may be made therein without departing from the scope of the present invention.

In this specification, the description has exemplarily been made to the case where history information of one virtual user is added into the filtering matrix. The invention and the preferred embodiments thereof are therefore not restricted to the above example but may vary within the scope of the claims. For example, identical history information of a plurality of virtual users may be added into the filtering matrix. In that case, the selected type of programs (in this case, professional baseball-related programs) may be set to be in a high level of the recommendation list.

The matter set forth in the foregoing description is offered by way of illustration only and not as a limitation. The actual scope of the invention is intended to be defined in the following claims when viewed in their proper perspective.

What is claimed is:

1. An information processor for supporting content processing for a recommended user having a known viewing history, based on a viewing history of each of a plurality of users, the processor comprising:
   a user's viewing history counter which counts the viewing history of each of the plurality of users;
   a similar user's viewing history counter which retrieves user information representing at least one similar user, whose viewing history includes selections similar to the viewing history of the recommended user, and counts the viewing history of the similar user of content other than the selections of the recommended user;
   a collaborative filtering processor which categorizes content recommendation information based on the viewing history information or operational information of the similar user, by counting up a number of times the similar user has viewed or reserved each content based on the viewing history of the similar user not counting the viewing history of the recommended user, in a collaborative filtering matrix, to obtain a matching number for each content indicating the number of similar users who have viewed or reserved the same content as the recommended user, and viewing history information or operational information which represents a group of hit programs obtained based on a search condition for realizing the search topic set by the recommended user in the collaborative filtering matrix, in which the counts of the viewing history information or operational information are mapped in association with each content per user excluding content already reserved by the recommended user, thereby executing the collaborative filtering process; and
   an information creator which creates content recommendation information including a selection of recommended programs to be provided to the recommended user, based on a result of the filtering process,
   wherein
   the information creator creates the content recommendation information to be provided to the recommended user and representing a recommendation list including contents which are selected in order based on the matching number.

2. The information processor according to claim 1, wherein,
   the information creator affixes additional information of each content into the recommendation list representing the contents.

3. The information processor according to claim 1, wherein,
   the information creator creates the content recommendation information which is sorted in groups of contents, one group of which is hits obtained based on a search condition for realizing a predetermined search topic and another group of which is contents that does not satisfy the search condition.

4. The information processor according to claim 1, further comprising:
   a condition setting unit which sets a search condition for realizing the search topic.

5. The information processor according to claim 1, further comprising:
   a virtual user setting unit which registers at least two virtual users in the collaborative filtering matrix at the same time.

6. The information processor according to claim 5, wherein,
   the virtual user setting unit sets a virtual recommended user whose viewing history information is included in the viewing history of the similar user of the recommended user and has a high matching number.

7. An information processing method of an information processing device, supporting content processing for a recommended user having a known viewing history, based on a viewing history of each of a plurality of users, the method comprising:
   counting the viewing history of the plurality of users at the information processing device;
   retrieving user information representing at least one similar user, whose viewing history includes selections similar to the viewing history of the recommended user, and counting the viewing history of the similar user of content other than the selections of the recommended user;
   categorizing content recommendation information based on the viewing history information or operational information of the similar user, by counting up a number of times the similar user has viewed or reserved each content based on the viewing history of the similar user not counting the viewing history of the recommended user, in a collaborative filtering matrix, to obtain a matching number for each content indicating the number of similar users who have viewed or reserved the same content as the recommended user, and viewing history information or operational information which represents a group of hit programs obtained based on a search condition for realizing the search topic set by the recommended user in the collaborative filtering matrix, in which the counts of the viewing history information or operational information are mapped in association with each content per user excluding content already reserved by the recommended user, thereby executing the collaborative filtering process; and
   creating content recommendation information including a selection of recommended programs to be provided to the recommended user, based on a result of the filtering process, wherein
   the information creating includes creating the content recommendation information to be provided to the recommended user, the content recommendation information representing a recommendation list representing contents which are selected in order based on the matching number.

8. The information processing method according to claim 7, wherein,
   the information creating includes affixing additional information of each content into the recommendation list of the contents.

9. The information processing method according to claim 7, wherein,
   the information creating includes creating the content recommendation information which is sorted in groups of contents, one group of which is hits obtained based on a search condition for realizing a predetermined search topic and another group of which is contents that does not satisfy the search condition.

10. The information processing method according to claim 7, further comprising:
    setting a search condition for realizing the search topic.

11. The information processing method according to claim 7, further comprising:
    virtual user setting including registering at least two virtual users in the collaborative filtering matrix at the same time.

12. The information processing method according to claim 11, wherein,
    the virtual user setting includes setting a virtual recommended user whose viewing history information is included in the viewing history of the recommended user and has a high matching number.

13. A computer program recorded on a non-transitory computer readable storage medium containing computer readable instructions for causing a computer to execute a program for supporting content processing for a recommended user having a known viewing history, based on a viewing history of each of a plurality of users, the computer program comprising:
    counting the viewing history of each of the plurality of users;
    retrieving user information representing at least one similar user, whose viewing history includes selections similar to the viewing history of the recommended user, and counting the viewing history of the similar user of content other than selections of the recommended user;
    categorizing content recommendation information based on the viewing history information or operational information of the similar user, by counting up a number of times the similar user has viewed or reserved each content based on the viewing history of the similar user not counting the viewing history of the recommended user, in a collaborative filtering matrix, to obtain a matching number for each content indicating the number of similar users who have viewed or reserved the same content as the recommended user, and viewing history information or operational information which represents a group of hit programs obtained based on a search condition for realizing the search topic set by the recommended user in the collaborative filtering matrix, in which the counts of the viewing history information or operational information are mapped in association with each content per user excluding content already reserved by the recommended user, thereby executing the collaborative filtering process; and
    creating content recommendation information including a selection of recommended programs to be provided to the recommended user, based on a result of the filtering process, wherein
    the information creating includes creating the content recommendation information to be provided to the recommended user, the content recommendation information representing a recommendation list representing contents which are selected in order based on the matching number.

14. The information processor according to claim 1, wherein the recommendation list is further represented in an order based on a type of each content.

15. The information processor according to claim 14, wherein the type of each content identifies a favorite type of content of the recommended user.

* * * * *